United States Patent
Fujii

(10) Patent No.: US 7,946,381 B2
(45) Date of Patent: May 24, 2011

(54) SOUND-ABSORBING DEVICE AND ITS MOUNTING METHOD

(75) Inventor: Yudai Fujii, Kashiwa (JP)

(73) Assignee: Nifco Inc., Yokohama-Shi, Kanagawa (JP)

( * ) Notice: Subject to any disclaimer, the term of this patent is extended or adjusted under 35 U.S.C. 154(b) by 274 days.

(21) Appl. No.: 12/224,488

(22) PCT Filed: Dec. 28, 2006

(86) PCT No.: PCT/JP2006/326279
§ 371 (c)(1),
(2), (4) Date: Oct. 21, 2008

(87) PCT Pub. No.: WO2007/099691
PCT Pub. Date: Sep. 7, 2007

(65) Prior Publication Data
US 2010/0224440 A1    Sep. 9, 2010

(30) Foreign Application Priority Data
Feb. 28, 2006    (JP) .................................. 2006-052810

(51) Int. Cl.
*F16K 47/02*    (2006.01)
(52) U.S. Cl. ......................................... 181/233; 29/428
(58) Field of Classification Search .................. 181/233, 181/284, 285, 290, 286; 29/428
See application file for complete search history.

(56) References Cited

U.S. PATENT DOCUMENTS

| 866,762 A * | 9/1907 | Wilson ........................... 181/233 |
| 2,813,593 A * | 11/1957 | Gladding ........................ 181/233 |
| 6,408,979 B1 | 6/2002 | Forbes et al. |
| 2005/0211500 A1* | 9/2005 | Wendt et al. .................. 181/295 |
| 2010/0224440 A1* | 9/2010 | Fujii .............................. 181/233 |

FOREIGN PATENT DOCUMENTS

| JP | H03-074218 | 3/1991 |
| JP | H10-006788 | 1/1998 |
| JP | 2003-049730 | 2/2003 |
| JP | 2003-170751 | 6/2003 |
| JP | 2004-322996 | 11/2004 |
| JP | 2005-170084 | 6/2005 |

* cited by examiner

*Primary Examiner* — Forrest M Phillips
(74) *Attorney, Agent, or Firm* — Manabu Kanesaka

(57) ABSTRACT

The degree of freedom of a sound-absorbing device in terms of size is increased, maintaining easy mounting operation of the sound-absorbing device, even if the sound-absorbing device has a greater length.

The sound-absorbing device 1, which alleviates and absorbs a sound generated by fuel movement in a fuel tank in such a state that the sound-absorbing device is put into the tank through an opening E formed in the tank and is mounted to the tank, has a three-dimensional structure, which has a narrower width X than a width of the opening and a greater length Y than the width of the opening E; and the sound-absorbing device comprising plural sound-absorbing parts 2A and 2B coupled together through a coupling portion 3 in an intermediate position in a longitudinal direction extending along the length Y.

11 Claims, 17 Drawing Sheets

Fig. 2
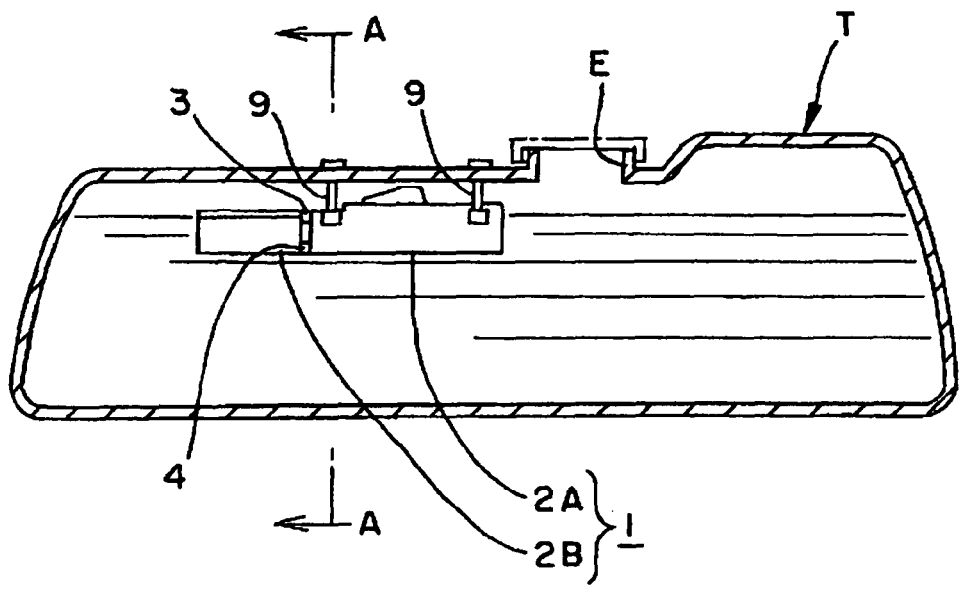
(a)
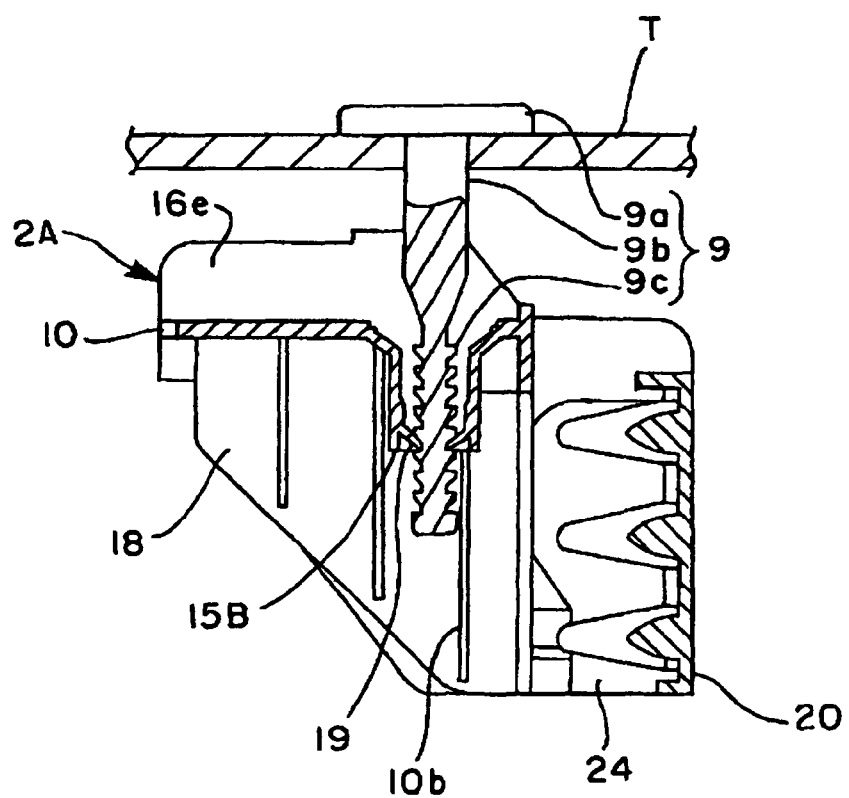
(b)

Fig. 3
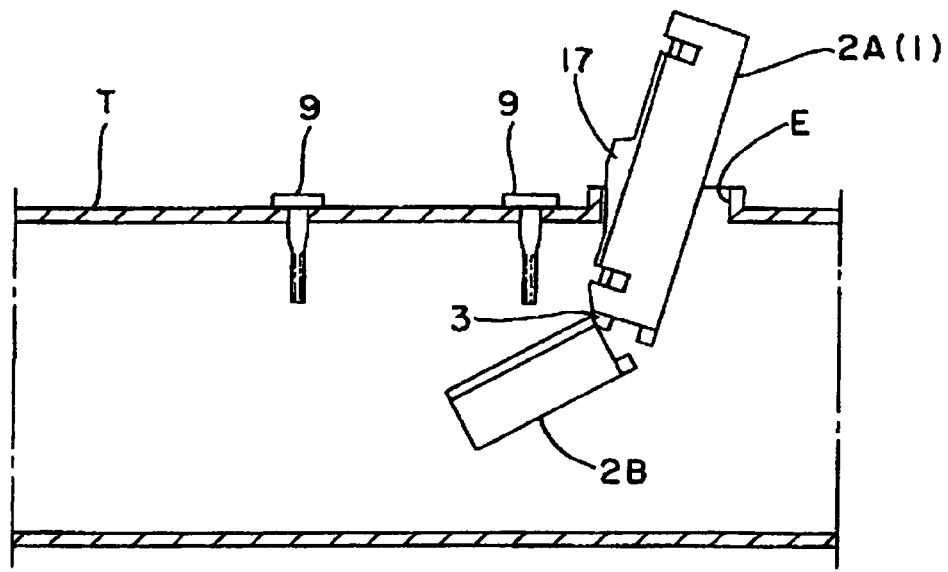
(a)
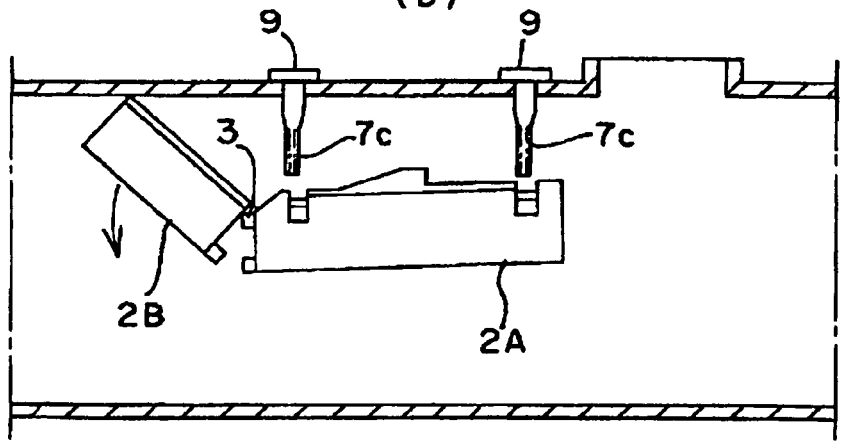
(b)
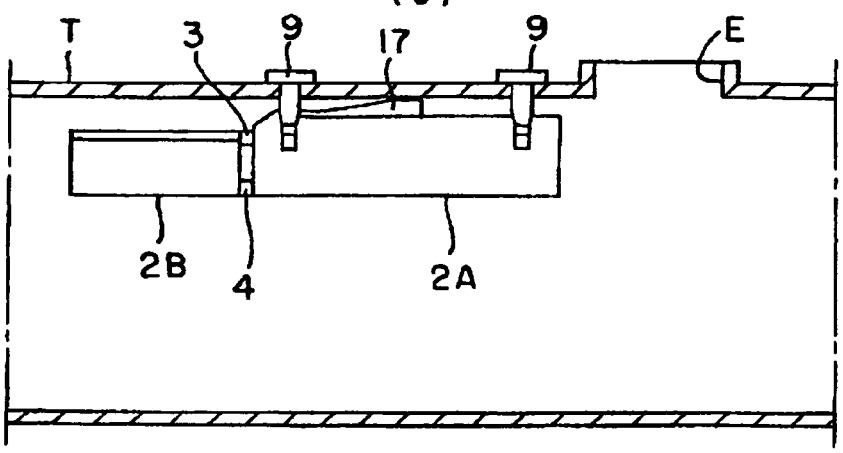
(c)

Fig. 6
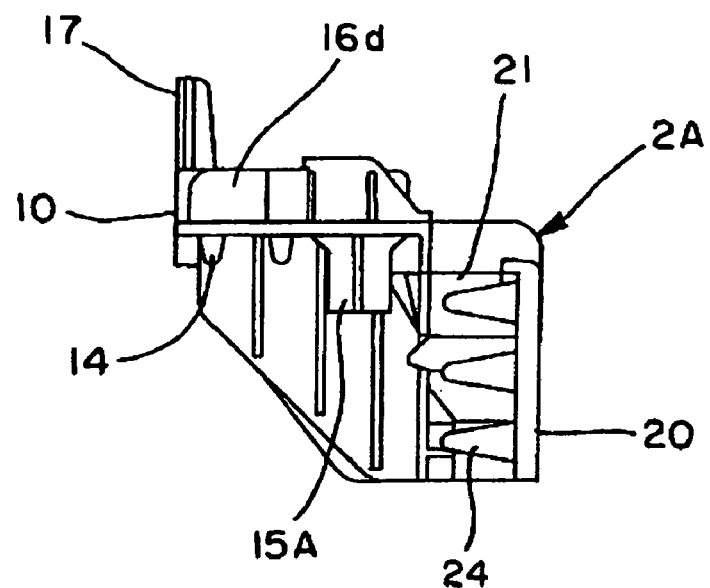
(a)
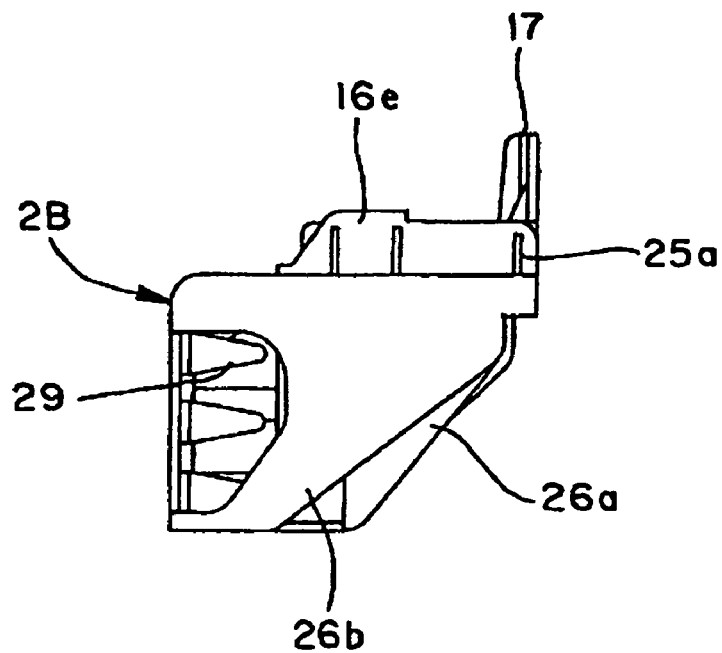
(b)

Fig. 7
(a)
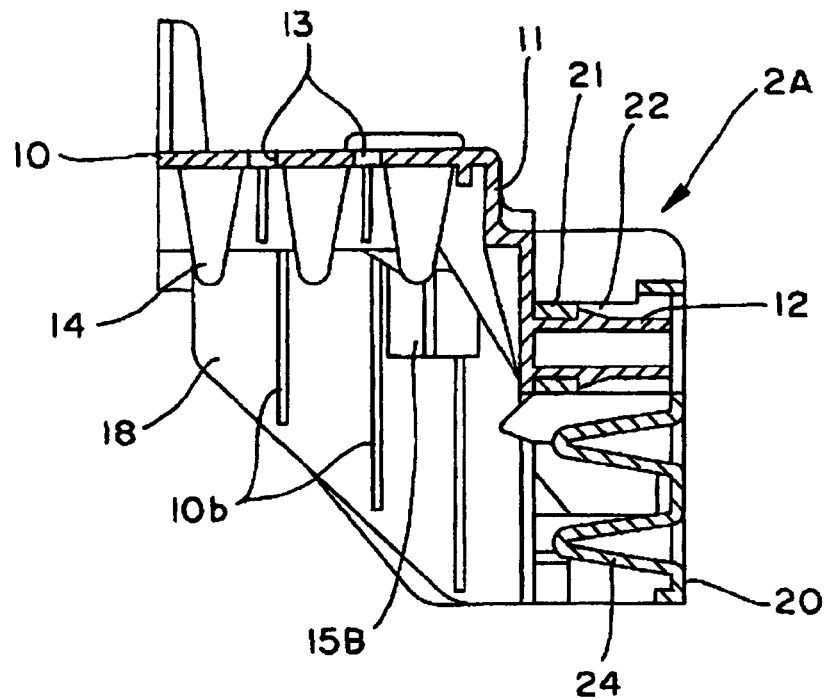
(b)
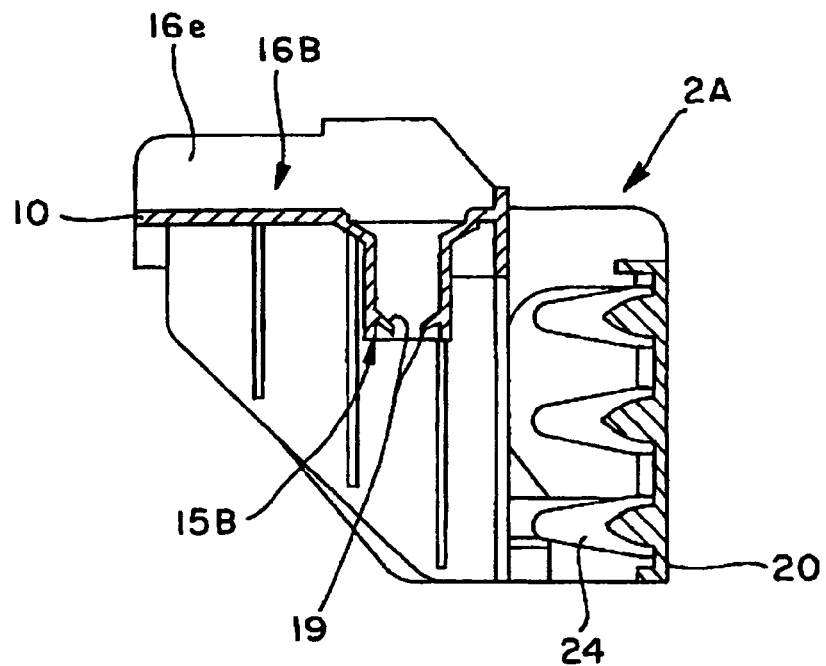

Fig. 14
(a)
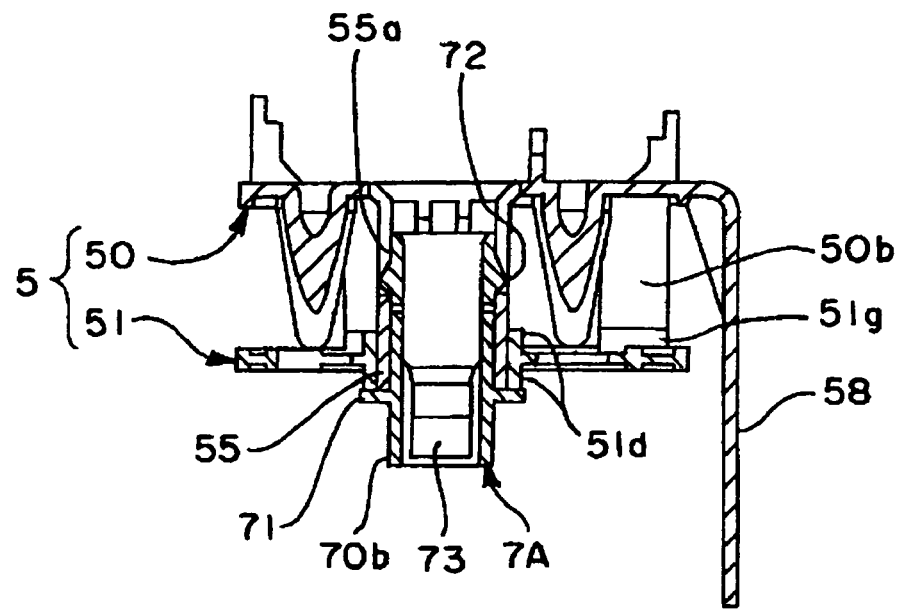
(b)
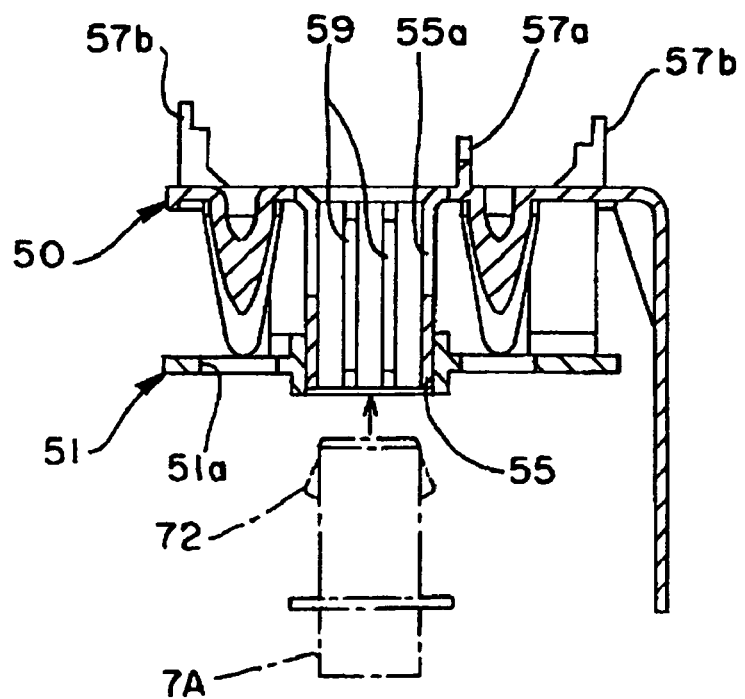

Fig. 16
(a)
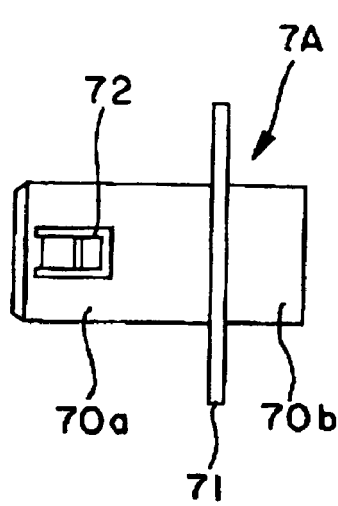
(b)
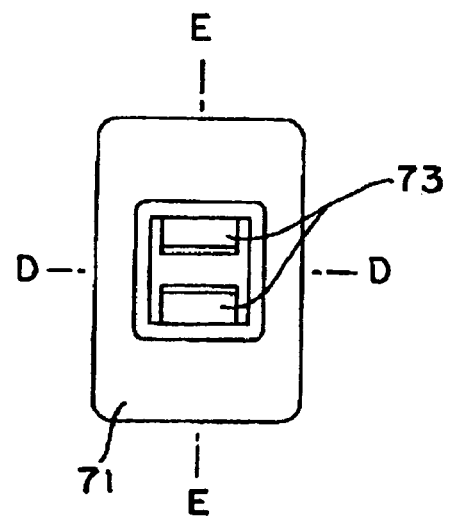
(c)
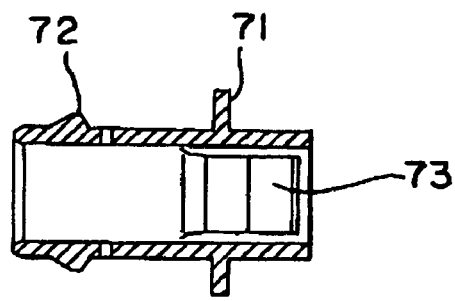
(d)
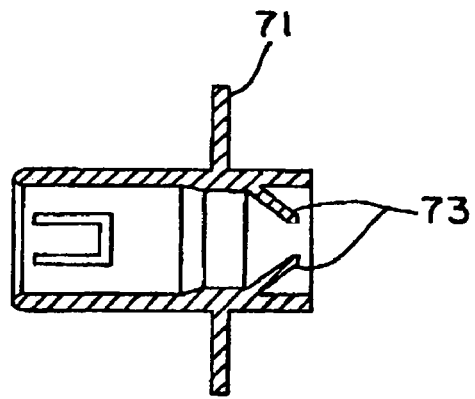

Fig. 17
(a)
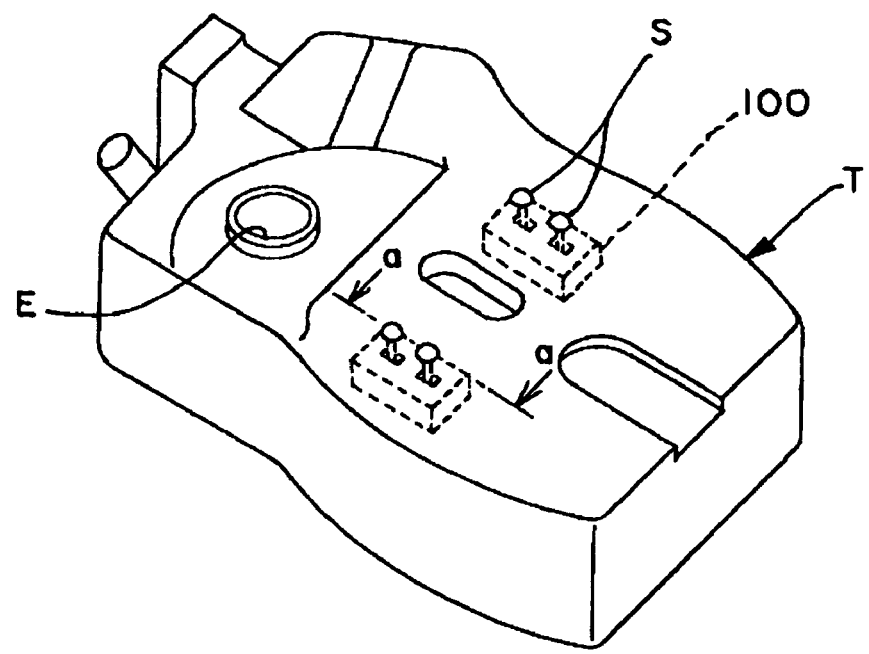
(b)
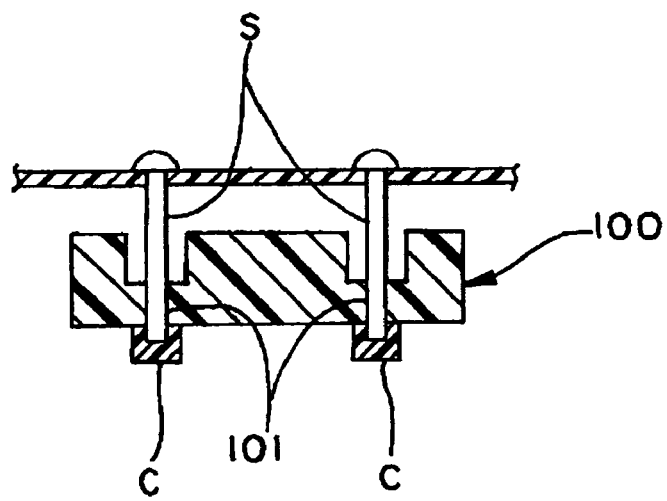

SOUND-ABSORBING DEVICE AND ITS MOUNTING METHOD

BACKGROUND OF THE INVENTION

1. Technical Field

The present invention relates to a sound-absorbing device, which is mounted to the inside of a fuel tank to alleviate and absorb the sound of liquid accompanied by fuel movement inside thereof, and a method for mounting the same.

2. Background Art

A fuel tank has a sound-absorbing device mounted to the inside thereof to alleviate and absorb the sound of liquid accompanied by fuel movement inside thereof. Such a sound-absorbing device may have various kinds of structures. FIGS. 17(a) and (b) show an example of the fuel tank, which has been disclosed in Patent Document 1, FIG. 17(a) is a perspective view of the fuel tank, and FIG. 17(b) is a cross-sectional view taken along line a-a of FIG. 17(a). The shown fuel tank has a tank body T integrally formed therewith by blow molding, includes, e.g. an opening E for attachment of a unit gauge and has stays S disposed at plural positions therein. Sound absorbing devices (baffles) 100, each of which has mounting holes 101 formed therein to pass therethrough in a thickness direction thereof, are fixed to the fuel tank by being put into the tank through the opening E, followed by inserting stays S in the mounting holes and disposing clips C on projection edges of the stays S.

Patent Document 1: Japanese Patent No. 3555335

DISCLOSURE OF THE INVENTION

Problems to be Solved by the Invention

The above-described conventional sound-absorbing devices 100 are subjected to limitations to width and length because of being put into the tank through, e.g. the opening E for attachment of a unit gauge and being positioned inside the tank. For example, as the thickness of a tank decreases, it becomes more difficult to mount such sound-absorbing devices to the tank since the sound-absorbing devices are more highly likely to be brought into conflict with the bottom of the tank when being put into the tank through the opening. For this reason, the problem has been dealt with by limiting the length of such sound-absorbing devices and increasing the number of the sound-absorbing devices to be mounted.

It is an object of the present invention to solve the above-mentioned problem and to provide a sound-absorbing device, which is capable of increasing the degree of freedom in the size thereof, maintaining an easy mounting operation of the sound-absorbing device and having an excellent sound-absorbing property even if the sound-absorbing device has a greater length, and a method for mounting the same.

Means for Solving the Problems

In order to attain the above-mentioned object, the present invention provides the following solutions:

According to a first aspect of the present invention, there is provided a sound-absorbing device, which is adapted to alleviate and absorb a sound generated by fuel movement in a fuel tank in such a state that the sound-absorbing device is put into the tank through an opening formed in the tank and is mounted to the tank; having a three-dimensional structure, which has a narrower width than a width of the opening and a greater length than the width of the opening; and the sound-absorbing device comprising plural sound-absorbing parts coupled together through a coupling portion in an intermediate position in a longitudinal direction extending along the length.

In the sound-absorbing device according to the present invention, it is preferred that the plural sound-absorbing parts be configured not only to be swingable between a first state and a second state through the coupling portion and that the plural sound-absorbing parts include a retainer, which is configured to selectively maintain the plural sound-absorbing parts in the first state and the second state so as to prevent the plural sound-absorbing parts from swinging; that the retainer be configured to prevent the plural sound-absorbing parts from swinging in conjunction with an operation, by which the plural sound-absorbing parts are selectively set in the first state and the second state through the coupling portion; that the retainer be configured to also serve as the coupling portion; that the sound-absorbing device further have an engageable portion formed therewith so as to be engageable with a stud projecting into the fuel tank; or that the engageable portion be configured to absorb variations in a projecting position of the stud.

According to a second aspect of the present invention, there is provided a method for mounting a sound-absorbing device, which is adapted to alleviate and absorb a sound generated by fuel movement in a fuel tank in such a state that the sound-absorbing device is put into the tank through an opening formed in the tank and is mounted to the tank; comprising a swinging step where the sound-absorbing device is swung about an intermediate portion thereof in a longitudinal direction thereof to be set in a first state; an inserting step where the sound-absorbing device is put into the tank through the opening, maintaining the first state; a re-swinging step where the sound-absorbing device is set from the first state to a second state to be ready for use in the tank; and a mounting step where the sound-absorbing device is mounted inside the tank.

In the method according to the present invention, it is preferred that the mounting step be conducted so as to be continuous to the re-swinging step where the sound-absorbing device is swung to the second state.

Effects of the Invention

In accordance with the first aspect of the present invention, the sound-absorbing device is formed of the plural sound-absorbing parts coupled together through the coupling portion in such an intermediate position in the longitudinal direction extending along the length. Thus, it is possible to improve the operation for mounting the sound-absorbing device inside the tank and to make the sound-absorbing device adaptable to tanks having different shapes by coupling the plural sound-absorbing parts to have an angle therebetween so as to easily put the plural sound-absorbing parts into the tank or by forming the plural sound-absorbing parts as a main part and a sub-part as shown as examples in the embodiments. It is possible to provide the sound-absorbing device with a sound-absorbing property set to be optimum to the shape of a tank by modifying the coupling angle of the main part and the sub-part (such as the extending directions of the sound-absorbing parts) as shown in a second embodiment.

The sound-absorbing device according to the present invention can reliably secure its optimum sound-absorbing property by utilizing the retainer to prevent the plural sound-absorbing parts from swinging with the plural sound-absorbing parts keeping a preferred state (the first state or the second state) to obtain an optimum sound-absorbing property, for example. When the retainer is configured to prevent the plural sound-absorbing parts from swinging in conjunction with an operation, by which the plural sound-absorbing parts are set in such a preferred state in order to obtain an optimum sound-absorbing property in the tank after the sound-absorbing device is put into fuel tank, it is possible to improve the mounting operation in the fuel tank.

In the sound-absorbing device according to the present invention, when the retainer is configured to also serve as the coupling portion, it is possible to simplify the sound-absorbing device in comparison with a case where the retainer and the coupling portion are separately disposed in the sound-absorbing device. When the sound-absorbing device is mounted with the engageable portion being engaged with a stud in the fuel tank, it is possible not only to eliminate a member serving as a conventional clip but also to easily obtain an easy mounting operation for example. When the sound-absorbing device is configured to be mounted even if the projecting position of a stud is deviated from a designed position, it is possible to alleviate, e.g. the accuracy required for the mounting position of a stud and to reduce the occurrence of defective products.

In the mounting method accordance with the second aspect of the present invention, even if the sound-absorbing device has a greater length than the conventional devices, it is possible to maintain an excellent operation for insertion into a fuel tank and to obtain an excellent sound-absorbing property in a state with the sound-absorbing device being mounted (ready for use). When the mounting step is conducted so as to be continuous to the step where the sound-absorbing device is swung to the second state in the re-swinging step, it is possible to improve the operation for mounting the sound-absorbing device.

BRIEF DESCRIPTION OF THE DRAWINGS

FIGS. 2(a) and (b) are a schematic view showing how the sound-absorbing device is mounted to a tank, and a cross-sectional view taken along line A-A of FIG. 2(a), respectively;

FIGS. 3(a) to (c) are schematic views showing an example of the mounting method of the sound-absorbing device;

FIGS. 6(a) and (b) are right and left side views of the sound-absorbing device, respectively;

FIGS. 7(a) and (b) are an enlarged cross-sectional view taken along line B-B of FIG. 4 and an enlarged cross-sectional view taken along line C-C of FIG. 4, respectively;

FIGS. 14(a) and (b) are an enlarged cross-sectional view taken along line A-A of FIG. 10 and an enlarged view of the sound-absorbing device with a coupler detached therefrom;

FIGS. 16(a) to (d) are a front view of the coupler shown in FIGS. 14(a) and (b), a right end view, a cross-sectional view taken along line D-D of FIG. 16(b) and a cross-sectional view taken along line E-E of FIG. 16(b), respectively; and FIGS. 17(a) and (b) are schematic views of the sound-absorbing device disclosed in Patent Document 1.

BEST MODE FOR CARRYING OUT THE INVENTION

Figure 1:
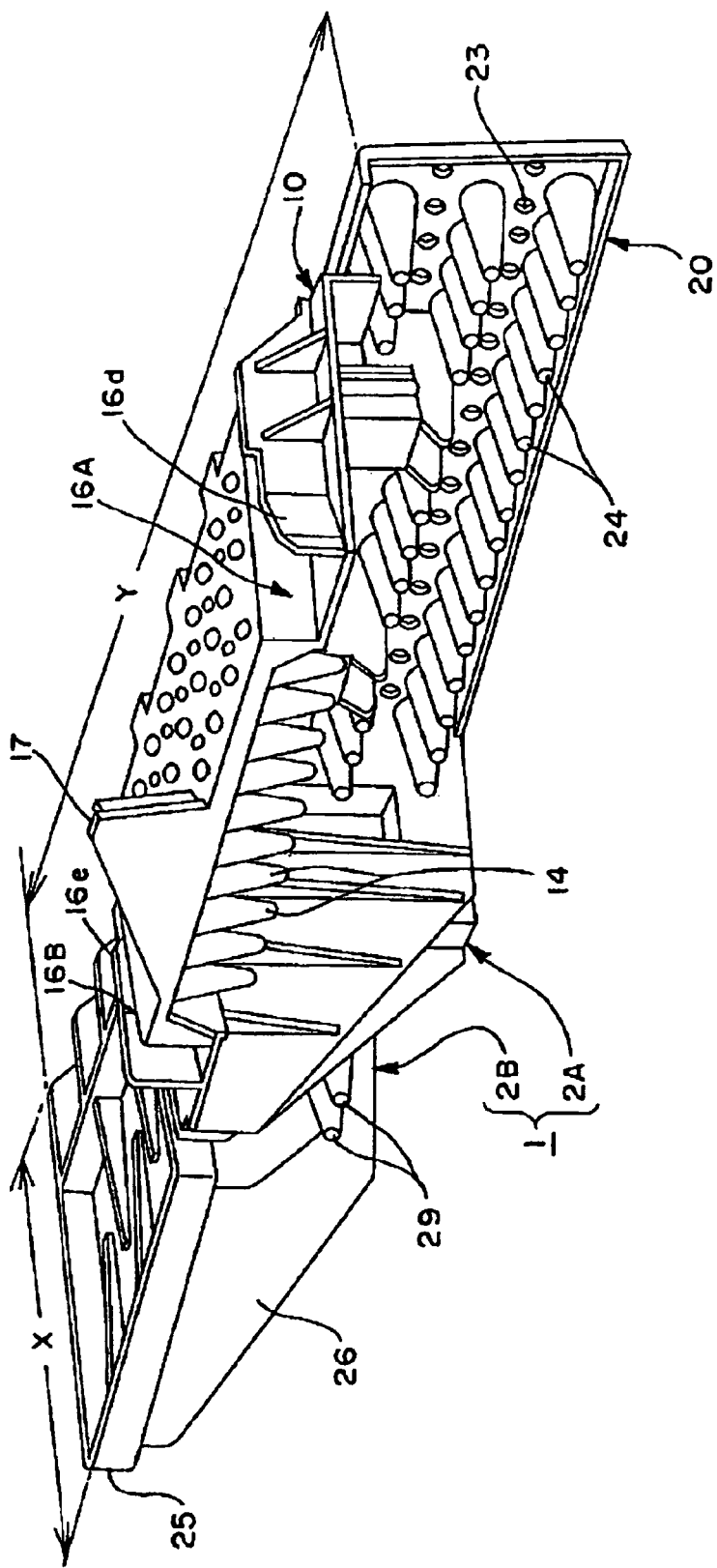
FIG. 1 is a schematic perspective view of the sound-absorbing device according to a first embodiment of the present invention, which is linearly set.

The sound-absorbing devices according to embodiments of the present invention will be described in reference to accompanying drawings. FIG. 1 to FIG. 8(b) show a first embodiment of the present invention, and FIG. 9 to FIG. 16(d) show a second embodiment of the present invention. Now, the structure of the device according to the first embodiment, the method for mounting the device according to the first embodiment, the structure of the device according to the second embodiment, and the method for mounting the device according to the second embodiment will be described in this order.

First Embodiment

The sound-absorbing device 1 shown in FIG. 1 to FIG. 8(b) is put into a tank through an opening E formed in a tank body T forming the tank and is fitted to studs 9 disposed to project into the tank. The sound-absorbing device has a three-dimensional structure, which has a narrower width X than the width of the opening E (hereinbelow, referred to as a short side acceptable into the opening E when the three-dimensional structure is divided into portions extending in short and long axes) and a greater length Y than the width of the opening E (hereinbelow, referred to as a long side unacceptable into the opening E when the three-dimensional structure is divided into the portions extending in the short and long axes), wherein the sound-absorbing device is formed of sound-absorbing parts 2A and 2B coupled together through a hinge 3 and a retainer 4 in a longitudinal direction extending along the length Y, the hinge and the retainer serving as a coupling portion. In other words, the sound-absorbing device 1 is formed in a three-dimensional structure having a greater length Y than the width of the opening E and is formed of sound-absorbing parts 2A and 2B, which are coupled together at an intermediate position of the sound-absorbing device in a longitudinal direction along the length so as to be swingable between a first state and a second state through a hinge 3 and are configured to selectively maintain the first state and the second state so that the sound-absorbing parts are prevented from swinging by a retainer 4.

The tank body T is formed of a resin-molded article, which is formed by blow molding as in the tank disclosed in Patent Document 1. The tank body has the opening E for attachment of a unit gauge or a similar opening formed therein. The tank body T has a wall formed with the plural studs 9 projecting therefrom for attachment of the sound-absorbing device 1. As shown in FIG. 2(b), each of the studs 9 has a head 9a, a shaft 9b and plural elastic engageable blades 9c integrally formed therewith, the head being adapted to be fixed to an outer side of the wall by, e.g. welding, the shaft projecting from the head and extending into the tank through a through hole formed in the wall, and the elastic engageable blades being disposed on the shaft at substantially equal distances in a region from an intermediate portion of the shaft 9b to a leading edge of the shaft.

Each of the sound-absorbing parts 2A and 2B is formed in a substantially reversed L-character shape in vertical section. The sound-absorbing part 2A serves as a main part, being formed of a horizontal plate 10 and a vertical plate 20. The sound-absorbing part 2B serves as a sub-part, being formed of a horizontal plate 25 and a vertical plate 26. Each of the horizontal plate 10 and the vertical plate 20, and every portion of the sound-absorbing part 2B are formed of a resin-molded article made of, e.g. a POM resin (polyacetal resin).

Figure 4:
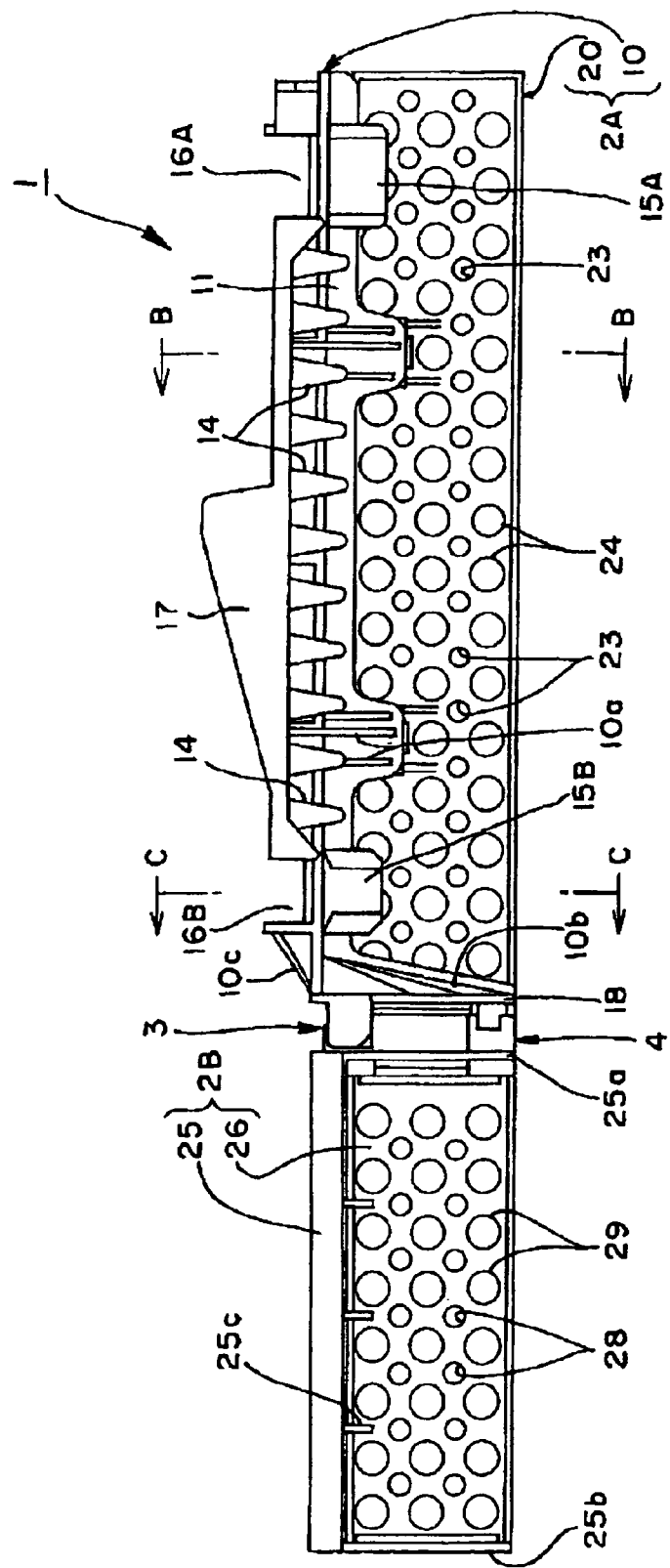
FIG. 4 is a front view of the sound-absorbing device, which is linearly set.

As shown in FIG. 4 and FIGS. 7(a) and (b), the horizontal plate 10 of the sound-absorbing part 2A has depressions formed in both ends in the longitudinal direction and has a connecting member 11 disposed on a rear side of the sound-absorbing part 2A so as to extend longitudinally, the connecting member 11 having two engageable projections 12 formed on an outer side thereof. The horizontal plate 10 has plural through holes 13 formed therein, except for the depression on both ends, so as to pass therethrough, plural projections 14 projecting from a lower side thereof and an upright wall 17 projecting along an upper front edge. The horizontal plate two tubular portions 15A and 15B, guiding recessed portions 16A and 16B, and a lateral wall 18 integrally formed therewith, the two tubular portions projecting downward from the respective depressions formed in both ends, the guiding recessed portions being recessed in the width direction of a top side of the horizontal plate so as to correspond to the top open ends of the two tubular portions, and the lateral wall being disposed at a connection side of the horizontal plate with the sound-absorbing part 2B. Reference symbols 10a to 10d designate reinforcing ribs. On the other hand, the vertical plate 20 has two frames 21 projecting from a front side thereof. The vertical plate is coupled with the horizontal plate 10, having the frames 21 receiving the corresponding engageable projections 12 with the projections elastically engaged with engageable holes 22 formed in the frames 21. The vertical plate 20 has plural through holes 23, plural projections 24 and a connecting frame 20a integrally formed therein, the through holes passing through the vertical plate from both front and rear sides of the vertical plate, the projections projecting from the front side of the vertical plate, and the connecting frame disposed at a connection side of the vertical plate with the sound-absorbing part 2B. The connecting frame is engaged with a projection 18a disposed on the lateral wall 18 in such a state that the horizontal plate 10 and the vertical plate 20 are coupled together by engagement between the engageable projections 12 and the engageable holes 22.

The through holes 13 and 23 are formed as small circular holes having the same diameter as one another at substantially equal distances in a left-to-right direction and a front-to-rear direction of the horizontal plate and in a left-to-right direction and a vertical direction of the vertical plate. The projections 14 and 24 are formed at substantially equal distances in the left-to-right direction and the front-to-rear direction of the horizontal plate and in the left-to-right direction and the vertical direction of the vertical plate so that a single through hole 13 or 23 is surrounded by four projections 14 or 24. Although each of the projections 14 and 24 is formed in a hollow conical shape in the shown embodiment, it is sufficient that each of the projections is formed in a tapered shape so as to be gradually narrower toward the leading edge. The projections 14 and 24 may have a height properly set. The through holes and the projections are adopted based on test results showing that it is preferred to dispose such through holes and such projections in terms of effective dispersion or attenuation of a liquid sound, i.e. the energy of a liquid sound.

Figure 5:
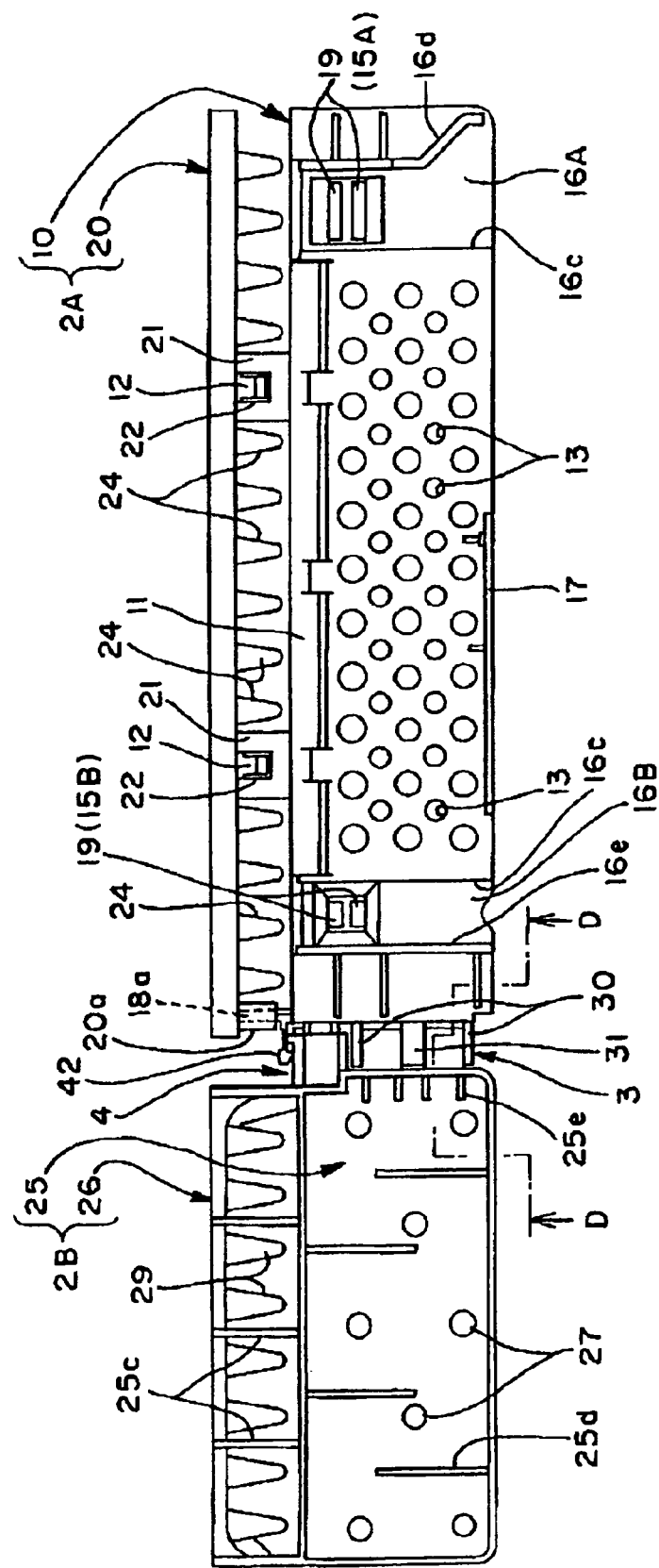
FIG. 5 is a top plan view of the sound-absorbing device, which is linearly set.
Figure 8:
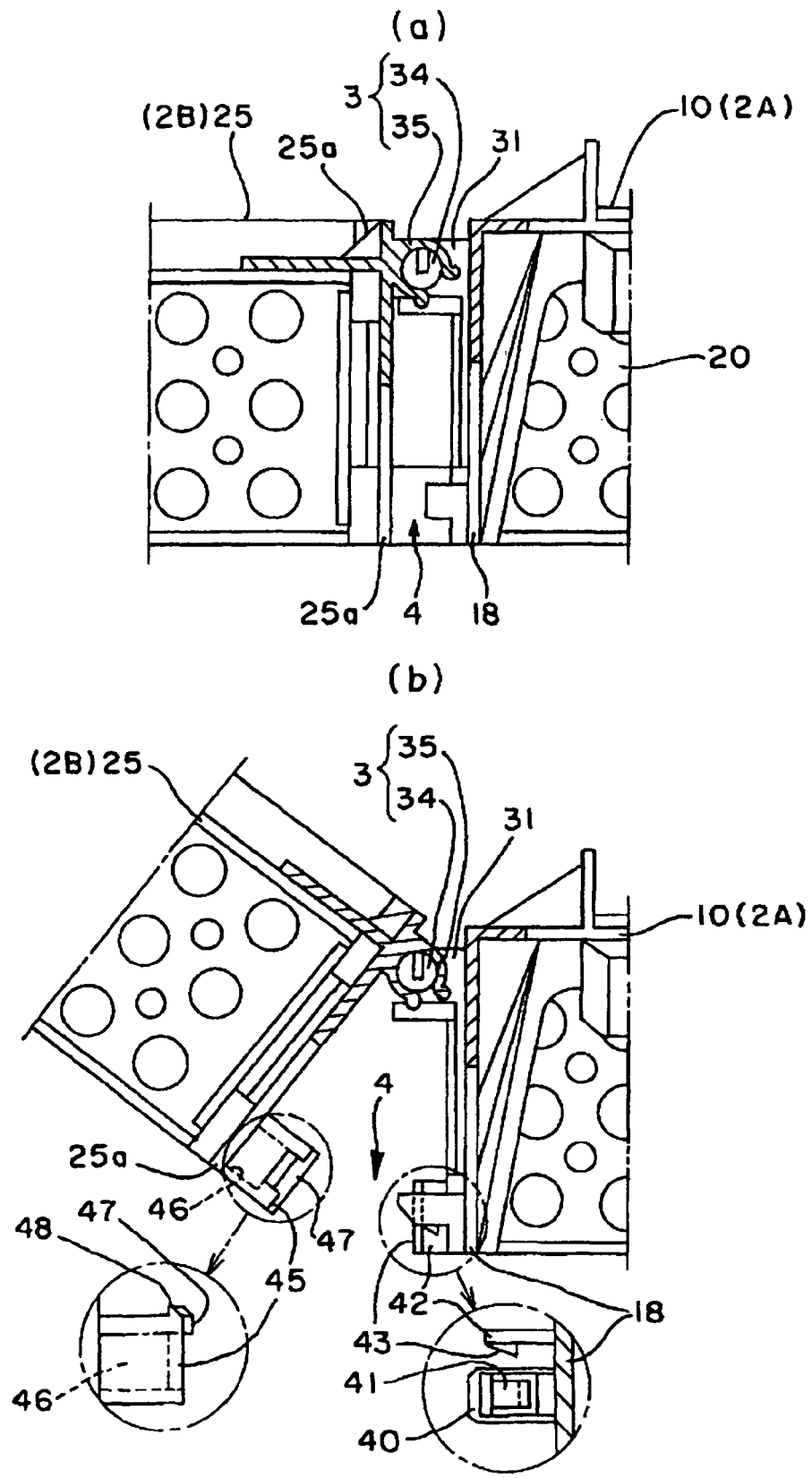
FIGS. 8(a) and (b) are schematic views showing how a retainer is locked and unlocked, which are taken along line D-D of FIG. 5.

Each of the tubular portions 15A and 15B is formed as a rectangular frame in transverse section. Each of the tubular portions has engageable strips 19 integrally formed on the inner wall thereof as shown in FIG. 7(b). In each of the tubular portions, the engageable strips 19 are formed to project downward from opposed surfaces on the inner wall in a width direction of the rectangular frame. The tubular portion 15A is formed so as to have a greater length than the tubular portion 15B in the longitudinal direction as shown in FIG. 5. The engageable strips 19 of the tubular portion 15A are formed so as to have a greater width accordingly. By this arrangement, even if the position of a stud 9 or the distance between adjacent studs 9 slightly deviates from a designed value, it is possible to insert studs 9 into the corresponding tubular portions 15A and 15B from the top ends of the tubular portions toward the lower ends of the tubular portions.

The recessed guiding portions 16A and 16B are formed so as to pass over the inlets of the tubular portions 15A and 15B and are defined by stepped walls 16c and 16c, and projecting ribs 16d, 16e disposed so as to face the respective stepped walls as seen from FIG. 3(b) and FIG. 5. The recessed guiding portion 16A has the rib 16d obliquely disposed so as to have a greater width toward a front side therein. By this arrangement, when the sound-absorbing part 2A is put into the tank body and is mounted to the tank in an invisible state, the studs 9 are allowed to be easily guided into the corresponding tubular portions 15A and 15B by the recessed guiding portions and the ribs 16e. The upright wall 17 is a rib, which serves to position the sound-absorbing part 2A so as to keep a gap between the sound-absorbing part and a mounting wall of the tank body.

On the other hand, the horizontal plate 25 of the sound-absorbing part 2B corresponds to the horizontal plate 10 and includes lateral walls 25a and 25b, plural connecting strips 25c and plural through holes 27, the lateral walls projecting downward from both ends of the horizontal plate, the connecting strips being integrally formed with the vertical plate 26 so as to keep a gap on a rear side, and the through holes passing through the horizontal plate from both top and bottom sides of the horizontal plate. The vertical plate 26 corresponds to the vertical plate 20 and includes plural through holes 28, plural projections 29 and other members, the through holes passing through the vertical plate from both front and rear sides of the vertical plate, the projections projecting from the front side.

The hinge 3 and the retainer 4 are disposed between the lateral wall 18 of the sound-absorbing part 2A and the lateral wall 25a of the sound-absorbing part 2B, the hinge 3 and the retainer 4 being set in an upper position and a lower position, respectively as shown in FIGS. 8(a) and (b). As shown in FIG. 5 and FIGS. 8(a) and (b), the hinge 3 is formed of three support ribs 30, 31 and 30 formed thereon at equal distances in a width direction of the lateral wall 18 so as to project from the lateral wall 18, shafts 34 disposed between one of the support ribs 30 and the support rib 31 and between the remaining support rib 30 and the support rib 31, and hooks 35, which are disposed on the lateral wall 25a so as to be swingably engaged with the shafts 34. By the hinge constructed as described above, it is possible to swing the sound-absorbing part 2A and the sound-absorbing part 2B by a certain angle (an angle of substantially 90 degrees in the shown embodiment) as shown in FIGS. 3(a) to (c). For example, it is possible to swingably set the sound-absorbing part 2B from the first state where the sound-absorbing part 2B is swung upwardly at an angle of substantially 90 degrees with respect to the sound-absorbing part 2A to the second state where the sound-absorbing part 2B is set in alignment with the sound-absorbing part 2A so as to be ready for use by utilizing a reaction force caused when the sound-absorbing part 2B is brought into contact with an inner wall of the tank.

The retainer 4 is formed of a first engageable portion 40 and a second engageable portion 42 projecting from the lateral wall 18, and a first retaining portion 45 and a second retaining portion 47 disposed on the lateral wall 25a so as to be engageable with and disengageable from the first engageable portion 40 and the second engageable portion 42, respectively, as shown in FIG. 5 and FIGS. 8(a) and (b). It should be noted that the engageable portions 40 and 42, and the retaining portions 45 and 47 are shown as seen from above in the enlarged views in FIG. 8(b). Specifically, the first engageable portion 40 is formed in such a substantially U-character shape as to project from the lateral wall 18 and has a pawl 41 formed thereon inside of such a substantially U-character shape so as to project downward. The second engageable portion 42 is located behind the first engageable portion 40 and is formed in a plate shape projecting from the lateral wall 18, having a pawl 43 formed on a leading edge thereof so as to project forward. On the other hand, the first retaining portion 45 is formed in a substantially rectangular frame shape projecting from the lateral wall 25a. When the first engageable portion 40 is inserted into such a rectangular frame shape with the pawl 41 being displaced in a retracting direction, the first engageable portion is engaged with a front end forming a lower recess 46 in such a rectangular frame shape with the pawl 41 being returned to its original state. The second retaining portion 47 has a pawl 48 formed as a vertical rib on a leading edge behind such a rectangular frame shape so as to be engageable with and disengageable from the pawl 43. When the second engageable portion 42 is brought close to the second retaining portion and has the pawl 43 climbing over the pawl 48 by utilizing elastic deformation, the second retaining portion 47 is engaged with the second engageable portion 42. In this arrangement, the first engageable portion 40 and the second engageable portion 42 form the retainer together with the first retaining portion 45 and the second retaining portion 47 in order to set the sound-absorbing part 2A and the sound-absorbing part 2B in substantially alignment with each other. Further, both engageable portions and both retaining portions play as stoppers to make it difficult for the respective engageable portions 40 and 42 to engage with the corresponding retaining portions 45 and 47 when the second engageable portion 42 is brought into contact with the leading edge of the second retaining portion 47 at the time of putting the sound-absorbing device according to the present invention into the tank. The retainer 4 may be formed of retaining portions 45 and 47 disposed on the lateral wall 18, and engageable portions 40 and 42 disposed on the lateral wall 25a.

(Mounting Method)

The above-mentioned sound-absorbing device 1 is put into the tank body T through the opening E and is mounted through the tubular portions 15A and 15B to the two studs 9, which have been disposed to project from the mounting wall. The mounting operation is performed in a swinging step where the sound-absorbing device 1 (the sound-absorbing parts 2A and 2B) is set in the first state with the sound-absorbing device bent at a certain angle through the hinge 3 for insertion into the tank; an inserting step where the sound-absorbing device 1 (the sound-absorbing parts 2A and 2B) is put into the tank body T through the opening E, maintaining the first state, as shown in FIG. 3(a); a re-swinging step where the sound-absorbing device 1 (the sound-absorbing parts 2A and 2B) is set from the first state to the second state to be ready for use in the tank T as shown in FIG. 3(b); and a mounting step where the sound-absorbing device 1 (the sound-absorbing parts 2A and 2B) is mounted to the studs 9 in the tank body T as shown in FIG. 3(c).

In the swinging step, the sound-absorbing device is set in the first state, without being retained by the retainer 4, by swinging the sound-absorbing part 2B with respect to the sound-absorbing part 2A by a certain angle about the hinge 3 for example. It is preferred to set the sound-absorbing device 1 to the first state in order to put the sound-absorbing device into the tank T through the opening E. In the shown embodiment, the sound-absorbing device is swung so as to be bent at an angle of about 45 degrees in the swinging step. In the inserting step, the sound-absorbing part 2B is first put into the tank body T so as to be close to the studs 9 with the sound-absorbing part 2A being held by a hand for example, and the sound-absorbing part 2A is subsequently put into the tank T. In the re-swinging step, the sound-absorbing device is swung and switched from the first state to the second state by utilizing a reaction force caused when is the sound-absorbing part 2B has an end portion brought into contact with the inner wall of the tank T. In the shown embodiment, the sound-absorbing device 1 is ready for use in the second state where the sound-absorbing part 2A and the sound-absorbing part 2B are in alignment with each other. In accordance with the arrangement of the embodiment, at the same time that the sound-absorbing device is switched to the second state, the sound-absorbing part 2A and the sound-absorbing part 2B are held in the second state through the above-mentioned retainer 4 (wherein the pawl 41 of the first engageable portion 40 is engaged with the recess 46 of the first retaining portion 45, and the pawl 43 of the second engageable portion 42 is engaged with the pawl 48 of the second retaining portion 47). The subsequent mounting step is conducted so as to be continuous to the re-swinging step. The sound-absorbing part 2A is positioned so as to have the tubular portions 15A and 15B set in alignment with the corresponding studs 9, being guided by the ribs 16e and by the guiding recessed portions 16A and 16B. Then, when the sound-absorbing device 1 (the sound-absorbing parts 2A and 2B) is pressed toward the mounting wall, the respective studs 9 pass through the gaps defined by the opposed engageable strips 19 of the tubular portions 15A and 15B, spreading the engageable strips, and each pair of the engageable strips 19 is engaged with the neck between adjacent engageable blades 9c corresponding thereto, with the upright wall 17 being brought into contact with the mounting wall. By this engagement, the sound-absorbing device is firmly mounted to the respective studs 9.

In accordance with this embodiment, the sound-absorbing device can be selectively set in the most preferred state for being put into a fuel tank and in a state for obtaining the optimum sound-absorbing property by swinging the plural sound-absorbing parts 2A and 2B through the hinge 3 as described above, the plural sound-absorbing parts extending along the length Y of the sound-absorbing device. In accordance with this sound-absorbing device, it is possible to set the sound-absorbing device in the first state and put the sound-absorbing device into a fuel tank through the opening E, followed by returning the sound-absorbing device to the second state for example. Even if the fuel tank is of a thin type, the sound-absorbing device can be provided with an excellent sound-absorbing property without preparing plural sound-absorbing devices by increasing the length of the sound-absorbing device in comparison with the conventional ones. In terms of mounting to a tank, it is possible to maintain effective insertion into the fuel tank, to make the mounting operation simple and to obtain an excellent sound-absorbing property in a mounting state (in use) even if the length of the sound-absorbing device 1 is increased in comparison with the conventional ones.

Second Embodiment

Figure 9:
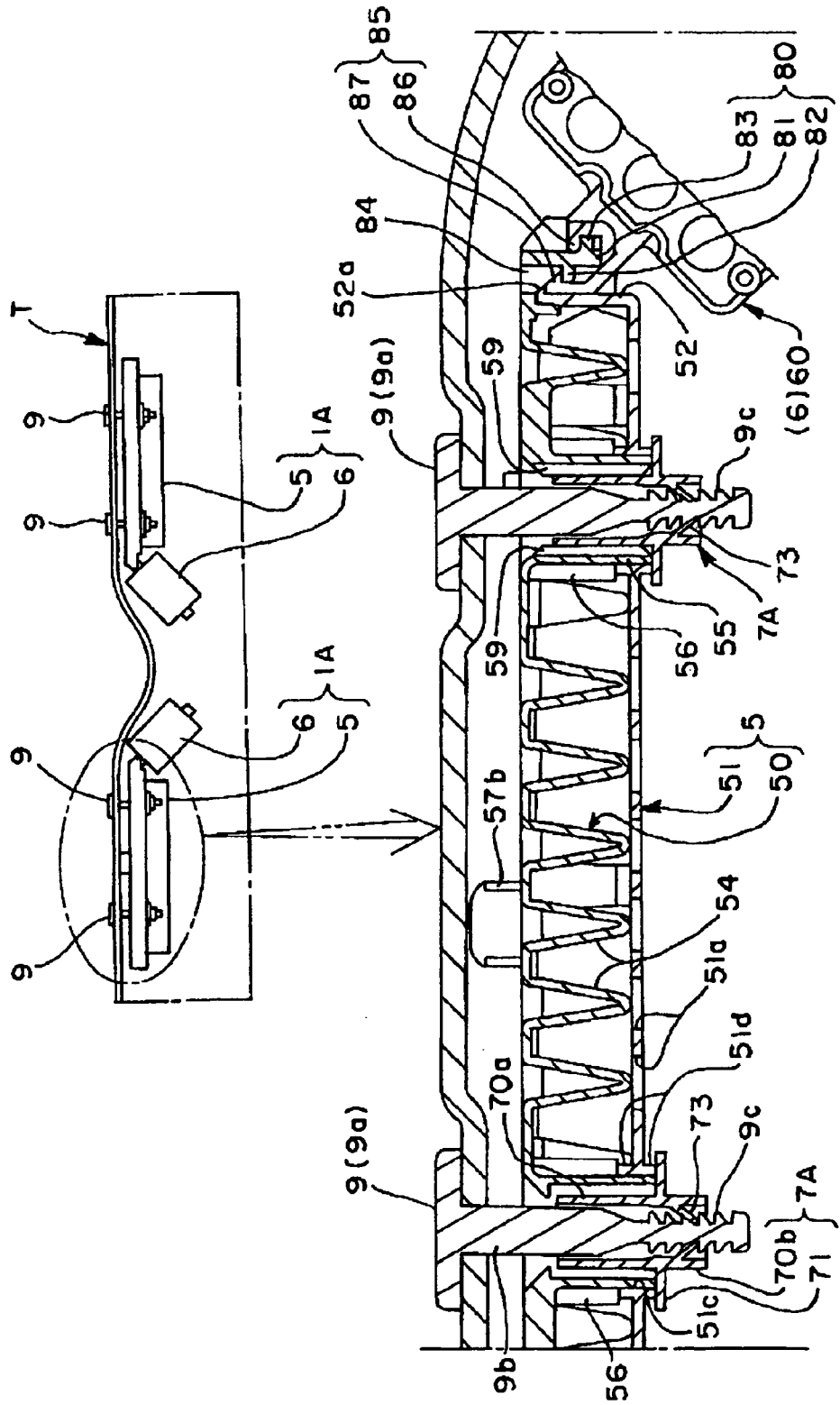
FIG. 9 is a schematic view showing the sound-absorbing device according to a second embodiment of the present invention, and an enlarged cross-sectional view thereof.
Figure 10:
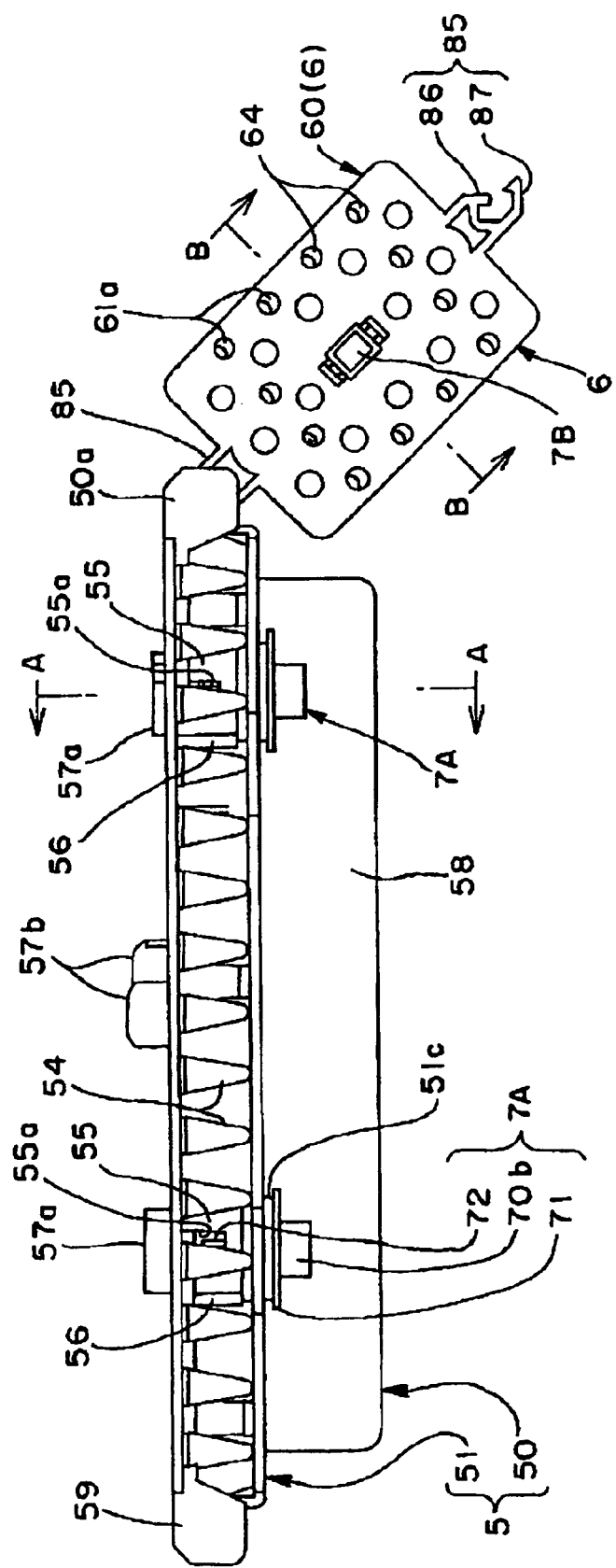
FIG. 10 is a front view of the sound-absorbing device shown in FIG. 9 in use
Figure 11:
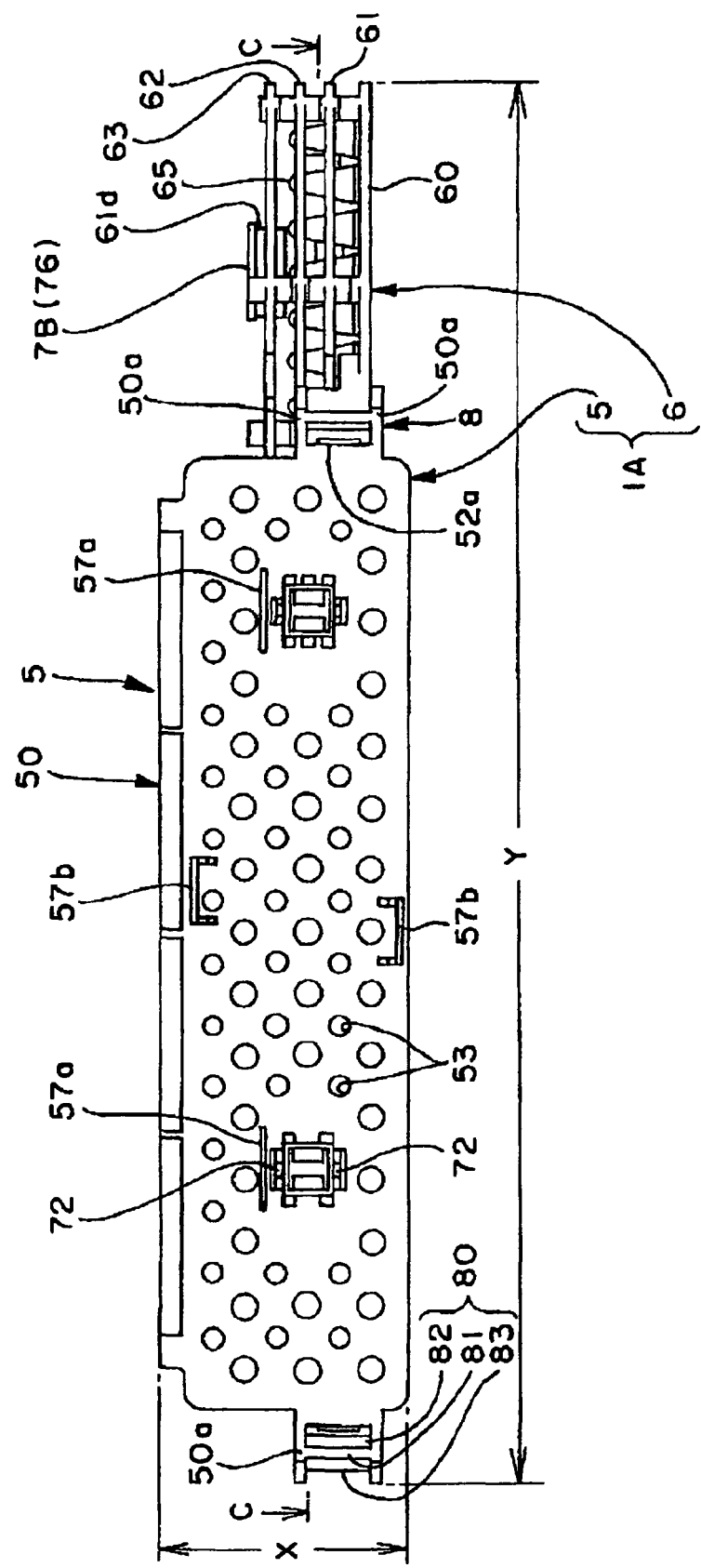
FIG. 11 is a top plan view of the sound-absorbing device shown in FIG. 9 in use.

Each of the sound-absorbing devices 1A shown in FIG. 9 to FIG. 16 is put into a tank through an opening (not shown) for attachment of a unit gauge formed in a tank body T forming the tank and is fitted to studs 9 disposed to project inside of the tank as in the first embodiment. The sound-absorbing device has a three-dimensional structure, which has a narrower width X than the width of the opening of the tank body and a greater length Y than the width of the opening of the tank body as shown in FIG. 11, wherein the sound-absorbing device is formed of sound-absorbing parts 5 and 6 coupled together in a longitudinal direction extending along the length Y through a retainer 8, which also serves as a hinge. In other words, each of the sound-absorbing devices 1A is formed in a three-dimensional structure having a greater length Y than the width of the opening of the tank body and is formed of sound-absorbing parts 5 and 6, which are coupled together at an intermediate position of the sound-absorbing device in a longitudinal direction along the length so as to be swingable between a first state and a second state by the hinge function of the retainer 8 and are configured to selectively maintain the first state and the second state so that the sound-absorbing parts are prevent from swinging by the retaining function of the retainer 8. The tank body T has studs 9 at totally four locations, i.e. two studs in each side, for mounting two sound-absorbing devices 1A to a mounting wall of the tank body as shown in the upper schematic view in FIG. 9. Each of the studs 9 has a head 9a, a shaft 9b and plural elastic engageable blades 9c integrally formed therewith as in the first embodiment.

In this embodiment, the sound-absorbing part 5 is a main part and is formed of plural plates 50 and 51 stacked integrally by couplers 7A. The sound-absorbing part 6 is a sub-part and is formed of plural plates 60 to 63 stacked integrally by a coupler 7B. The plates and the couplers are formed of a resin-molded article made of, e.g. a POM resin. Each of the plates 50 and 51 and the plates 60 to 63 is formed of a rigid plate, which is difficult to deform and is formed in a substantially rectangular shape. The inner plate (the first plate) 50 or 60 that is disposed at a position closest to the mounting wall of the tank body has a significantly different shape from the other plates 51 and 61 to 63. The plates 61 to 63 will be explained with the plate 61 being taken as an example since they are identical or similar to each other in terms of shape.

In the sound-absorbing part 5, the inner plate 50 has plural through holes 53, plural projections 54, left and right tubular portions 55 and 55, guiding ribs 57a, upright walls 57b as stoppers, a vertical wall 58, and a pair of support members 50a and 50a integrally formed therewith, the through holes passing therethrough from a top side to a bottom side thereof, the projections and the tubular portions projecting from the bottom side thereof, the guiding ribs and the upright walls projecting from the top side thereof, the vertical wall projecting downward from a rear edge thereof, and the support members projecting from both lateral sides thereof as shown in FIG. 9 to FIG. 11.

The through holes 53 are formed as small circular holes at substantially equal distances in a left-to-right direction and a front-to-rear direction of the inner plate. The projections 54 are formed at substantially equal distances in the left-to-right direction and the front-to-rear direction of the inner plate so that a single through hole 53 is surrounded by four projections 54 at portions except for the provision of the tubular portions 55. Although each of the projections 54 is formed in a hollow conical shape in the shown embodiment, it is sufficient that each of the projections is formed in a tapered shape so as to be gradually narrower toward the leading edge. Each of the tubular portions 55 is formed as a substantially rectangular frame in transverse section. Each of the tubular portions 55 has engageable holes 55a and a pair of regulation ribs 56 formed at a base side thereof, the engageable holes being oppositely formed so as to pass through front and rear rectangular walls, and the regulation ribs projecting from outer sides of left and right rectangular walls as shown in FIG. 9 and FIGS. 14(a) and (b). In the right tubular portion 55 in the shown embodiment, the left and right rectangular walls have registration ribs 59 oppositely disposed on inner sides so as to extend vertically. Each of the engageable holes 55a is formed in a substantially rectangular shape and is configured to engageably receive elastic pawls 72 of a coupler 7A, which is described later in detail. Each of the registration ribs 56 serves as a projection for keeping a gap between each of the registration ribs and the plate 51 disposed below each of the registration ribs. Each of the registration ribs 59 serves as a rib for guiding the corresponding coupler 7A. In the left tubular portion in the shown embodiment, the registration ribs are not shown for simplification. The guiding ribs 57a are disposed on a rear side so as to correspond to the inlets of the tubular portions 55 as shown in FIG. 11. When the sound-absorbing part 5 is mounted to the tank body, the guiding ribs are brought into contact with studs 9, making it easier to put the studs in alignment with the inlets of the tubular portions 55. The upright walls 57b serve as ribs for positioning the sound-absorbing part so as to keep a gap between the sound-absorbing part and the mounting wall of the tank body. When the sound-absorbing part 5 is mounted, the vertical wall 58 is brought into contact with a portion of the mounting wall of the tank body corresponding thereto, serving to stably hold the sound-absorbing part without wobble even if an impact is applied.

Figure 12:
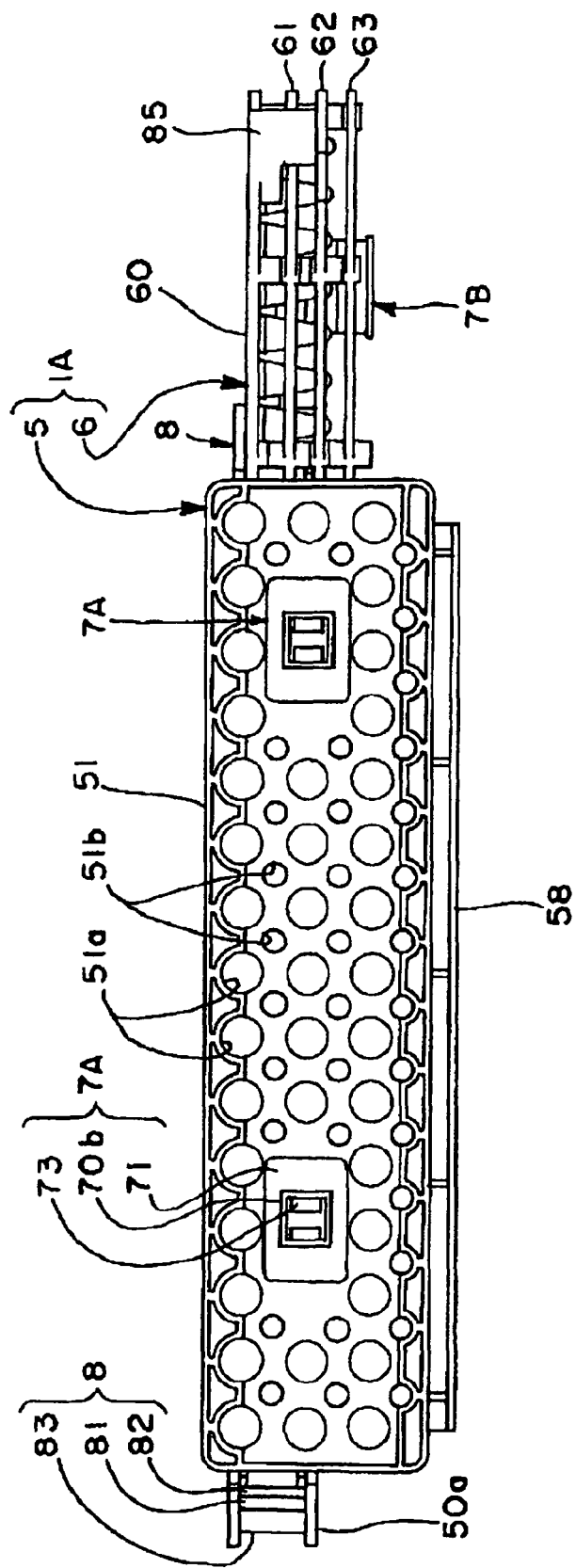
FIG. 12 is a bottom view of the sound-absorbing device shown in FIG. 9 in use.
Figure 13:
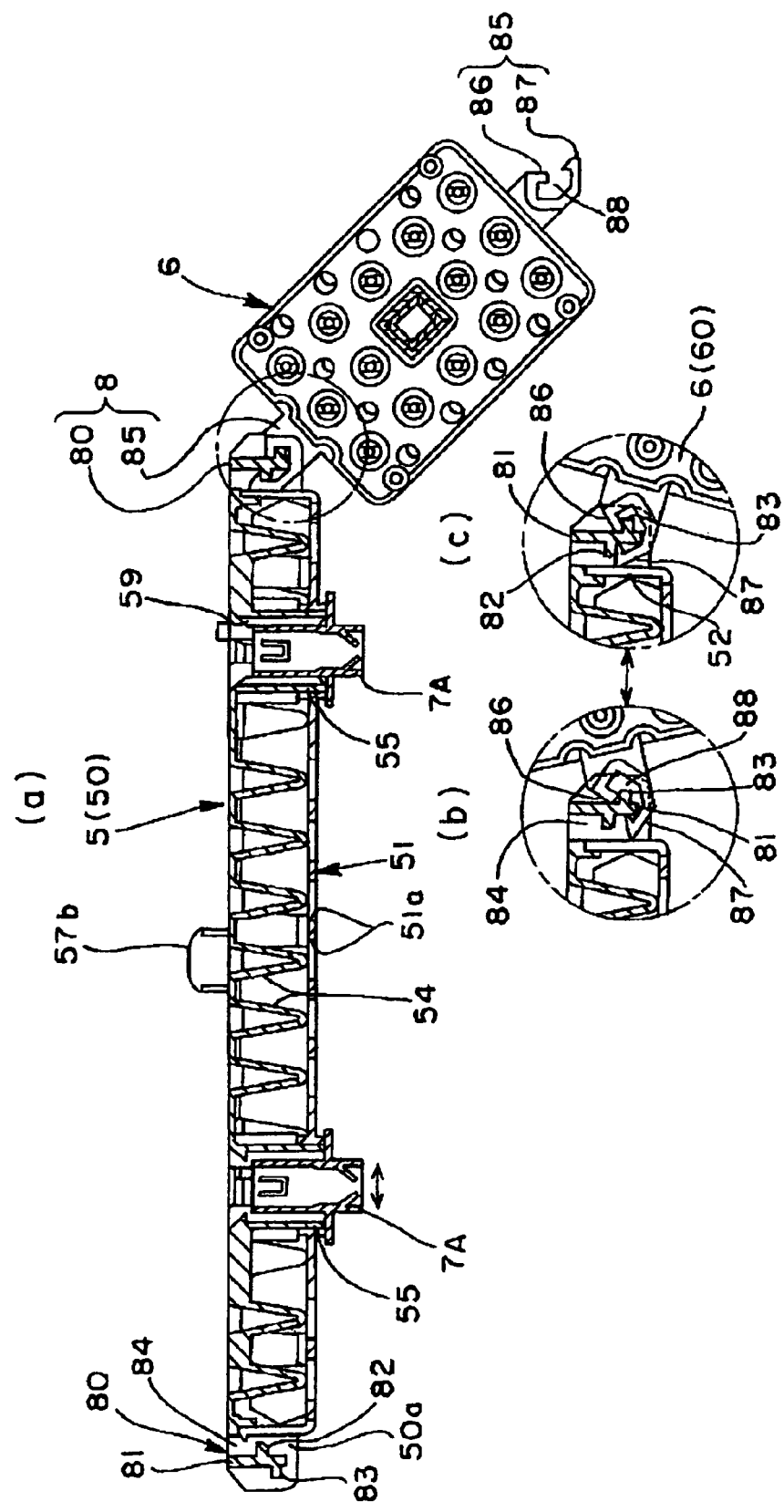
FIG. 13(a) is a cross-sectional view taken along line C-C of FIG. 11, and FIGS. 13(b) and (c) are reference views of the sound-absorbing device, which are swung through a hinge.
Figure 15:
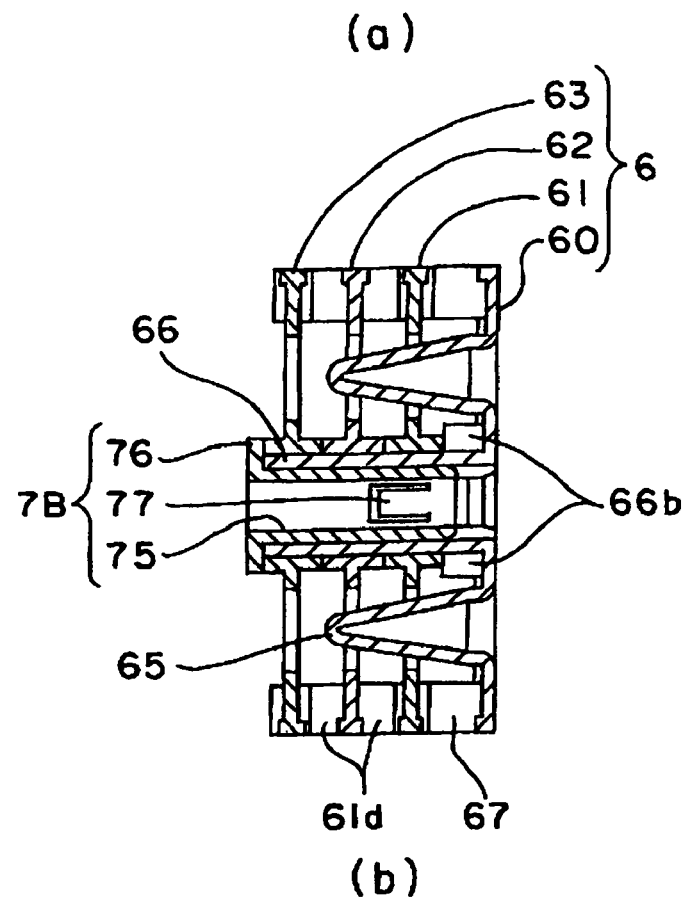
FIGS. 15(a) and (b) are an enlarged cross-sectional view taken along line B-B of FIG. 10 and an enlarged view of the sound-absorbing device with the coupler detached therefrom.

The plate 51 is formed in a rectangular shape having substantially the same size as the inner plate 50 and has plural through holes 51a and 51b, frames 51c, registration ribs 51d and coupling strips 52 integrally formed therewith, the through holes passing therethrough from a top side to a bottom side thereof, the frames disposed at right and left positions to receive the tubular portions 55, the registration ribs fringing upper and lower sides of the frames 51c, and each of the coupling strips being raised on both lateral sides of the plate so as to be acceptable between each pair of the support members 50a (each gap 84 describe later) as shown in FIG. 9 and FIG. 12. The through holes 51a are formed as such circular holes as to receive the projections 54 with play and confront with the corresponding projections 54 when the plate 51 and the inner plate 50 are stacked each other. The through holes 51b are formed in the same way as the through hole 53 and confront with the through holes 53 when the plate 51 and the inner plate 50 are stacked each other. The frames 51c are formed as such rectangular holes as to correspond to the tubular portions 55 and are fringed with the registration ribs 51d projecting from the upper and lower sides of the plate 51. The registration ribs 51d serve to secure a certain gap between the plate 50 and the plate 51 when the tubular portions 55 are inserted into the corresponding frames 51c in order to stack the plate 51 and the inner plate 50. Each of the coupling strips 52 on both lateral sides has a pawl 52a formed on an outer side of a leading edge thereof to project therefrom.

Each of the couplers 7A is formed in a substantially angular tubular shape and has an inserted portion 70a, a grasping portion 70b, a rectangular flange 71, the elastic pawls 72 and engageable strips 73 formed therewith, the inserted portion being configured to be received into a corresponding tubular portion 55, the grasping portion being continuous with the inserted portion and configured to be positioned outside the corresponding tubular portion 55, the rectangular flange projecting from the outer periphery of each of the couplers to divide each of the couplers into the inserted portion 70a and the grasping portion 70b, the elastic pawls being disposed on respective opposing walls defining the inserted portion 70a, and the engageable strips projecting from the inner sides of respective opposing walls of the inserted portion 70a without the pawls 72 formed therein as shown in FIGS. 16(a) to (d).

Each of the inserted portions 70a is formed in such a size as to be inserted into a corresponding tubular portion 55 without keeping a gap between opposing walls thereof with the pawls 72 and the tubular portion. Each is of the inserted portions is configured to be inserted into the corresponding tubular portion along the ribs without keeping a gap between opposite walls thereof with the engageable strip 73 and the ribs 59 in a case with the ribs disposed or to be inserted into the tubular portions with keeping a slight gap between the opposite walls with the engageable strip and the corresponding tubular portion in a case without the ribs disposed as shown in FIG. 9 and FIGS. 14(a) and (b). By the provision of such gaps, it is possible to make the couplers 7A slightly shiftable in order to adjust the position of the couplers 7A with keeping the engagement between the pawls 72 and the engageable holes 55a even if the position of a stud 9 or the distance between the relevant studs 9 is slightly deviated from a designed position. Each of the grasping portions 70b serves as a portion to be utilized for grasping the coupler 7A by a hand or a robot hand and has the engageable strips 73 projecting from the inner sides of the opposing walls. Each of the flanges 71 is configured to be brought into contact with the end face of the corresponding tubular portion 55 with the inserted portion 70a inserted into the tubular portion 55 and with the elastic pawls 72 engaged with the engageable holes 55a, and to serve as a retainer to prevent the falling out of the plate 51 stacked through the tubular portions. Each of the elastic pawls 72 is delimited by a slit having a substantially U-character shape and formed in a lower portion of the inserted portion 70a. The elastic pawls are inwardly deformed in the course of being inserted into the corresponding tubular portion. When the pawls arrive at the corresponding engageable holes 55a, the pawls are returned to their original states, being engaged with the engageable holes 55a. It should be noted that the plates 50 and 51 have bosses 50b and 51g formed at plural positions on the opposing sides thereof to stack the plate 50 and the plate 51 with keeping a gap therebetween corresponding to the lengths of the bosses 50b and 51g as shown in FIG. 14.

On the other hand, the sound-absorbing part 6 is positioned in an obliquely downward direction with the sound-absorbing part 5 being horizontally positioned as shown in FIG. 10 and FIGS. 15(a) and (b). This sound-absorbing part includes the inner plate 60, which has plural through holes 64, plural projections 65, a central tubular portion 66 and ribs 67 formed therewith, the through holes passing therethrough from a front side to a rear side thereof, and the projections and the central tubular portion projecting from the rear side thereof. The through holes 64 are formed as small circular holes at substantially equal distances in a left-to-right direction and a vertical direction of the inner plate. The projections 65 are formed at substantially equal distances in the left-to-right direction and the vertical direction of the inner plate so that a single through hole 64 is surrounded by four projections 65 at portions except for the provision of the tubular portion 66. Although each of the projections 65 is formed in a hollow conical shape in the shown embodiment, it is sufficient that each of the projections is formed in a tapered shape so as to be gradually narrower toward the leading edge. The tubular portion 66 is formed as a substantially rectangular frame having a hole passing through this sound-absorbing part from a front side to a rear side thereof. The tubular portion has engageable holes 66a and a pair of regulation ribs 66b formed at a base side thereof, the engageable holes being oppositely formed so as to pass through right and left rectangular walls, and the regulation ribs projecting from outer sides of vertical rectangular walls. Each of the engageable holes 66a is configured to engageably receive elastic pawls 77 of the coupler 7B, which is described later in detail. The ribs 67 are disposed at plural positions to serve as a projection for keeping a gap between each of the ribs and the subsequent plate 61.

The plate 61 is formed in a rectangular shape having substantially the same size as the inner plate 60 and includes plural through holes 61a and 61b, a central frame 61c and a registration rib 61d, the through holes passing therethrough from a front side to a rear side thereof, the frame disposed to receive the tubular portion 66, and the registration rib fringing the frame 61c (the explanation of which is also applied to plates 62 and 63). The through holes 61a are disposed to correspond to the through holes 64. The through holes 61b are formed as such circular holes as to receive the projections 65 with play. When the plate 61 and the inner plate 60 are stacked, the projections are put in and face the through holes 61b at corresponding positions with play. The frame 61c is formed as such a rectangular hole as to correspond to the tubular portion 66 and is fringed with the registration rib 61d. The registration rib 61d serves to secure a certain gap between the plate 61 and the inner plate 60 when the tubular portion 66 is inserted into the corresponding frame 61c in order to stack the plate 61 and the inner plate 60.

The coupler 7B is formed in a substantially angular tubular shape and has an inserted portion 75, a rectangular flange 76 and the elastic pawls 77 formed therewith, the inserted portion being configured to be received into the tubular portion 66, the rectangular flange projecting from the outer periphery of the inserted portion at a rear side of the coupler, and the elastic pawls being disposed on respective opposing walls defining the inserted portion 75. The inserted portion 75 is formed in such a size that the inserted portion can be inserted into the tubular portion 66 without keeping a gap between opposing walls thereof with the pawls 77 and the tubular portion 66. The flange 76 is configured to be brought into contact with the end face of the tubular portion 66 with the inserted portion 75 inserted into the tubular portion 66 and with the elastic pawls 77 engaged with the engageable holes 66a, and to serve as a retainer to prevent the falling out of the plates 61, 62 and 63 stacked through the tubular portion. Each of the elastic pawls 77 is formed so as to be delimited by a slit having a substantially U-character shape and formed in a lower portion of the inserted portion 75. The elastic pawls are inwardly deformed in the course of being inserted into the tubular portion 66. When the pawls arrive at the engageable holes 66a, the pawls are returned to their original states, being engaged with the engageable holes 66a.

The retainer 8 is formed of a retaining portion 80 disposed on the inner plate 50 forming the sound-absorbing part 5 and an engageable portion 85 disposed on the inner plate 60 forming the sound-absorbing part 6 as shown in FIG. 9 and FIGS. 13(a) to (c), having both of a holding function and a hinge function. In the shown embodiment, the retaining portion 80 is disposed on each ends of the inner plate 50, and the engageable portion 85 is disposed on each end of the inner plate 60. Accordingly, the sound-absorbing device according to this embodiment may be used in a connecting state other than the connecting state shown in the drawings. For example, the sound-absorbing device may be configured so that two sound-absorbing parts 6 are coupled to the right and left ends of the sound-absorbing part 5, or two sound-absorbing parts 5 are coupled to both ends of the sound-absorbing part 6.

Each of the retaining portion 80 is disposed to connect between the support member 50a and the support member 50a and is formed of a vertical plate 81 extending vertically, an inner transverse rib 82 formed on an inner side of the vertical plate 81 and projecting from the vertical plate at a substantially middle position in a vertical direction, and an outer transverse rib 83 formed at a lower position on an outer side of the vertical plate 81 so as to project therefrom. The vertical plate 81 is disposed to keep a gap having a certain width between the vertical plate and an edge portion of the plate 50 corresponding thereto. On the other hand, the engageable portion 85 is formed of a short engageable strip 86 and a long engageable strip 87, which are disposed at a substantially middle position on a lateral side of the inner plate 60, the short engageable strip projecting from the lateral side so as to extend downward from above, and the longer engageable strip projecting from the lateral side so as to extend upward from below, with the result that both engageable strips form an engageable space 88 in a semi-closed state.

By the above-mentioned arrangement, the inner plate 60 (the sound-absorbing part 6) is hinged to the inner plate 50 (the sound-absorbing part 5) so as to be prevented from being swung as required as described below. In this hinged coupling, the engageable portion 85 is coupled to the retaining portion 80 so that the short engageable strip 86 is engaged with the outer transverse rib 83, and the long engageable strip 87 is passed through a lower portion of the gap 84 and is engaged with a lower inner end of the vertical plate 81 as shown in FIG. 13(b) as a reference view. In this state, the inner plate 60 (the sound-absorbing part 6) can be clockwise swing in an obliquely downward direction, i.e. until the long engageable strip 87 is brought into contact with the inner transverse rib 82 as shown in FIG. 13(c) (In the shown embodiment, the inner plate 60 is coupled to the inner plate 50 so as to be swingable by an angle of about 30 degrees).

In order to set the sound-absorbing device in a retaining state, the inner plate 60 is forcibly swung in a further clockwise direction from the state shown in FIG. 13(c). Thus, as shown in FIG. 9, the short engageable strip 86 of the inner plate 60 (the sound-device 6) is engaged with the outer transverse rib 83, and the long engageable strip 87 of the inner plate 60 (the sound-absorbing device 6) forcibly climbs over the inner transverse rib 82 to be engaged with a top end face of the inner transverse rib 82, with result that the inner plate 60 (the sound-absorbing device 6) is retained so as not to be swingable with respect to the inner plate 50 (the sound-absorbing device 5). When the retainer 8 is switched to the above-mentioned retaining state, the retainer is prevented from being inadvertently released from the retaining state since the long engageable strip 87 fills in the gap 84 while the long engageable strip 87 has a leading edge caught between the top end face of the inner transverse rib 82 and the pawl 52a of the coupling strip described above.

(Mounting Method)

As in the first embodiment, the above-mentioned sound-absorbing device 1A is put into the tank body T through the opening of the tank and is mounted through the tubular portions 7A and 7A to the two studs 9, which have been disposed to the mounting wall. The mounting operation is performed in a swinging step where the sound-absorbing device 1A (the sound-absorbing parts 5 and 6) is set in the first state by the hinge function of the retainer 8 for insertion into the tank; an inserting step where the sound-absorbing device 1A (the sound-absorbing parts 5 and 6) is put into the tank body T through the opening of the tank, maintaining the first state; a re-swinging step where the sound-absorbing device 1A (the sound-absorbing parts 5 and 6) is set from the first state to the second state to be ready for use in the tank T; and a mounting step where the sound-absorbing device 1A (the sound-absorbing parts 5 and 6) is mounted to the studs 9 in the tank body T as shown in FIG. 9.

In the swinging step, the sound-absorbing device is set in the first state, without being retained by the retainer 8, by utilizing the hinge function of the retainer 8 to swing the sound-absorbing part 6 with respect to the sound-absorbing part 5 by a certain angle for example. It is preferred to set the sound-absorbing device 1A to the first state in order to put the sound-absorbing device into the tank T. In the inserting step, the sound-absorbing part 6 is first put into the tank body T so as to be close to the studs 9 with the sound-absorbing part 5 being held by a hand for example, and the sound-absorbing part 5 is subsequently put into the tank T. In the re-swinging step, the sound-absorbing device is swung and switched from the first state to the second state by utilizing a reaction force caused when the sound-absorbing part 6 has an end portion brought into contact with the inner wall of the tank T. In the shown embodiment, the sound-absorbing device 1A is ready for use in the second state where the sound-absorbing part 6 is set at an angle of about 45 degrees with respect to the sound-absorbing part 5. In accordance with the arrangement of this embodiment, at the same time that the sound-absorbing device is switched to the second state, the sound-absorbing part 5 and the sound-absorbing is part 6 are held in the second state through the retaining function of the retainer 8 described above. The subsequent mounting step is conducted so as to be continuous to the re-swinging step. Specifically, the sound-absorbing part 5 is positioned so as to have the respective tubular portions 7A set in alignment with the corresponding studs 9, being guided by the ribs 57a. Then, when the sound-absorbing device 1A (the sound-absorbing parts 5 and 6) is pressed toward the mounting wall, the respective studs 9 pass through the gaps defined by the opposed engageable strips 73 of the corresponding tubular portions 7A, spreading the engageable strips, and each pair of the engageable strips 73 is engaged with the neck between adjacent engageable blades 9c corresponding thereto with the upright walls 57b being brought into contact with the mounting wall. By this engagement, the sound-absorbing device is firmly mounted to the respective studs 9. Accordingly, the above-mentioned sound-absorbing device 1A can also have an advantage similar to the first embodiment, and the structures of the respective parts can be simplified since the retainer 8 has both of the hinge function and the retaining function.

Although the respective embodiments have been described about a case where the tank body T is formed by blow molding, the tank body may be formed by any other method than blow molding as long as the tank includes the opening. Although the respective embodiments have been described about a case where each of the projections is formed in such a substantially conical shape having a hollow space therein, each of the projections may have a leading edge cut or have a peripheral wall curved. In such cases, when the leading edge has a through hole or a small aperture formed therein, it is possible to prevent a liquid, such as fuel, from staying inside the hollow space even if the projection is put with the leading facing downward.

The entire disclosure of Japanese Patent Application No. 2006-052810, filed on Feb. 28, 2006, including the specification, claims, drawings and summary, is incorporated herein by reference.

The invention claimed is:

1. A sound-absorbing device to be disposed in a fuel tank, comprising:
    a plurality of sound-absorbing parts arranged side by side in a longitudinal direction, and
    a coupling portion integrally formed with the sound-absorbing parts without being separated from the sound-absorbing parts in any state where the sound-absorbing parts are bendable or not, said coupling portion including a hinge portion bendably connecting two of the sound-absorbing parts together, and a retainer for fixing the two sound-absorbing parts in a predetermined fixed posture without bending so that the two sound-absorbing parts bent with respect to each other through the hinge portion when the sound-absorbing device is placed inside the fuel tank are held in the predetermined posture through the retainer when the sound-absorbing device is maintained in the fuel tank.

2. The sound-absorbing device according to claim 1, wherein the hinge portion comprises support ribs fixed to the sound-absorbing parts and a shaft rotationally attached to the support ribs; and the retainer is spaced from the hinge portion and comprises first and second retaining portions formed at one of the sound-absorbing parts, and first and second engageable portions formed at the other of the sound-absorbing portions and engaging the first and second retaining portions.

3. The sound-absorbing device according to claim 2, wherein the first engageable portion includes a first pawl and the second engageable portion is spaced from the first engageable portion and includes a second pawl; and the first retaining portion includes a front end engaging the first pawl and a third pawl engaging the second pawl.

4. The sound-absorbing device according to claim 1, wherein the hinge portion and the retainer are formed integrally, and comprises a retaining portion formed at one of the sound-absorbing parts and an engageable device formed at the other of the sound-absorbing parts and engaging the retaining portion.

5. The sound-absorbing device according to claim 4, wherein the retaining portion comprises a vertical plate, an inner transverse rib formed on an inner side of the vertical plate and projecting therefrom, and an outer transverse rib formed at a lower outer side of the vertical plate; and the engageable device comprises a short strip and a long strip with a space in a semi-closed state therebetween so that when the outer transverse rib is in the space, the retaining device is rotatable with the engageable device, and when the inner and outer transverse ribs are held in the space, the retaining device is fixed to the engageable device.

6. The sound-absorbing device according to claim 1, further comprising an engageable portion formed at the sound absorbing part so as to be engageable with a stud projecting into the fuel tank.

7. The sound-absorbing device according to claim 6, wherein the engageable portion is configured to absorb variations in a projecting position of the stud.

8. A combination comprising a fuel tank with an opening, and the sound-absorbing device of claim 1, wherein each of the sound absorbing parts has a width narrower than that of the opening, and a length greater than the width of the opening.

9. A method for mounting a sound-absorbing device, comprising:
    preparing sound-absorbing parts arranged side by side in a longitudinal direction so that the sound-absorbing parts are bendable at a coupling portion formed therebetween,
    bending the sound-absorbing parts from the coupling portion so that an insertion length of the sound-absorbing parts into a fuel tank through an opening thereof is shortened,
    inserting the sound-absorbing parts bent at the coupling portion into the fuel tank through the opening,
    expanding the sound-absorbing parts bent at the coupling portion in the fuel tank to a direction where the sound-absorbing parts are not bent, and
    mounting the sound-absorbing parts inside the fuel tank to absorb a sound generated by fuel movement in the fuel tank,
    wherein the sound-absorbing parts extending in the longitudinal direction have a length such that the sound-absorbing parts can not be inserted into the fuel tank through the opening due to a thickness of the fuel tank without bending the sound-absorbing parts.

10. The method according to claim 9, wherein the mounting step continues after the expanding step.

11. The method according to claim 9, wherein the sound-absorbing parts inserted into the fuel tank are expanded horizontally in the longitudinal direction and maintained in the expanded condition, the sound-absorbing parts being mounted in the expanded condition.

* * * * *